Jan. 18, 1938.　　　　　F. KLEFFEL　　　　　2,105,661

MULTIPLEX FILM PHONOGRAPH

Filed Nov. 3, 1934　　　2 Sheets-Sheet 1

INVENTOR
FRITZ KLEFFEL
BY H. S. Grover
ATTORNEY

Jan. 18, 1938.   F. KLEFFEL   2,105,661
MULTIPLEX FILM PHONOGRAPH
Filed Nov. 3, 1934   2 Sheets-Sheet 2

INVENTOR
FRITZ KLEFFEL
BY H.S.Swover
ATTORNEY

Patented Jan. 18, 1938

2,105,661

UNITED STATES PATENT OFFICE 2,105,661

MULTIPLEX FILM PHONOGRAPH

Fritz Kleffel, Berlin, Germany, assignor to Klangfilm G. m. b. H., Berlin, Germany, a corporation of Germany Application November 3, 1934, Serial No. 751,322
In Germany November 3, 1933

1 Claim. (Cl. 179—100.3)

The present invention relates to a mixing arrangement for sound film work, and more particularly to a variety thereof including a multiplex film phonograph. Arrangements of this kind are used in the talking film arts, for instance, for the purpose of combining acoustic actions that had been recorded at different places, and possibly also at different times, upon one and the same sound action carrier or support by that the records of the different films are electrically summated or aggregated, and thus mixed are then recorded again. Such a mixing device therefore consists of several mechanically intercoupled reproducing units. Such a reproducer unit essentially comprises a take-up and a feed spool, conveyor means or feeder means for the film, and a sound control (pick-up) point with photo-electric means and optionally also an amplifier.

In the mixing arrangements known in the earlier art up to three films could be mixed simultaneously. The design of these outfits was predicated upon and was patterned after the simple projector machines adapted to the reproduction of sound films in moving picture theatres. Thus three such reproducer units were built alongside one another, and in this kind of equipment three film feed spools were placed adjacent at the top end, and three take-up spools were mounted at the bottom, while somewhere between these two sets were disposed the sound pick-up means, and three conveyor rolls were arranged upon a common shaft before and, optionally, also after the acoustic pick-up means.

Now, constructions of this kind involved the drawback that because of the said joint driving shaft it was difficult to insert the film or to discontinue or interrupt the operation of any of the film feeds at will. Another drawback of the old arrangement was that the number of paths or feeds of film could not be increased essentially for this would have necessitated further bearing points between the drive rolls or spockets upon the joint shaft, and this would have further aggravated the task of inserting the films. Another demerit of this arrangement was that the distribution of the flywheel masses required for insuring uniformity of travel and feed was attended with difficulties.

Now, these difficulties are obviated by a mixer arrangement of the kind here disclosed. This according to the invention is attained essentially by that, in the first place, the film spools and the film paths are all located in one plane so that the corresponding film margins of all films are conveyed and fed in one plane, and in the second place by that all reproducing units are driven from different points of a joint drive wheel. Such an arrangement, on the one hand, allows of raising the number of mixing points almost ad libitum, and of providing for each mixing place or unit a flywheel, while enjoying at the same time the advantage that the construction is compact, rugged, and easily following up, and also that the equipment is handy in manipulation and attendance. Moreover, the arrangement is handy for spooling film from one spool to another.

One object of my invention is to provide a multiplex film phonograph in which the films are handled in a horizontal plane.

Another object of my invention is to provide a multiplex film phonograph in which all the reproducing units are conveniently accessible to a single operator.

Another object of my invention is to provide a multiplex film phonograph which is capable of using either reels of film or endless loops of film.

Another object of my invention is to provide such a device in which all the films are driven at the same speed.

Another object of my invention is to provide a multiplex film phonograph which is capable of simultaneously reproducing some of the films and rewinding others.

Another object of my invention is to provide a multiplex film phonograph with the spools so arranged upon the supporting bed that all the film openings therein are visible from the middle of the apparatus.

Another object of my invention is to provide such an apparatus in which each film spool is capable of being engaged or disengaged at will independently of the others.

Another object of my invention is to provide such an apparatus in which all of the reproducer units are driven from a common drive wheel.

Another object of my invention is to provide an apparatus of the class described which has a main driving motor for driving the apparatus at a predetermined speed and an additional motor of the three-phase type for driving the apparatus in synchronism with other apparatus.

Another object of my invention is to provide a sound gate having two light openings either of which can be used to actuate the photocell.

Another object of my invention is to provide such a film gate in conjunction with a shiftable light source.

Other and incidental objects of my invention will be apparent to those skilled in the art from a reading of the following specification and an inspection of the accompanying drawings in which.

Figure 1:
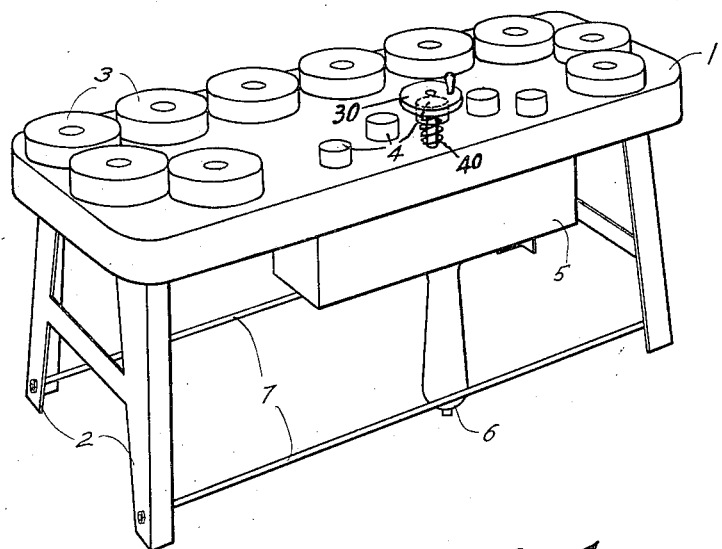
Figure 1 is an assembly view of a quintuple mixer.

In the quintuple mixer shown in Fig. 1, 1 denotes the horizontal supporting plate or bed which rests on legs 2, the plate and feed, if desired, being made integral. On the plate are the spools 3. According to the invention, all of these film spools are placed in one and the same plane, in other words, the distance of all spools from the top of the bed plate is the same; for the sake of simplicity of disposition all of them are mounted adjacent to one another upon three sides of the bed. The film feeding and scanning or pick-up means are shown merely schematically and are designated by 4. They are distributed about the center of the bed plate, and they are so arranged according to the invention that the films on their way from the feed to the take-up spools in all of the units travel in one and the same plane in reference to their edges, that is to say, in the case here shown, in a horizontal plane. The film conveyance and pick-up means therefore are at the same distance from the bed plate.

The drive means are preferably mounted below the bed plate and are encased in 5. For a further supporting of the bed plate an additional leg 6 being conveniently adjustable in length or height is provided. For further bracing of the structure connecting rods 7 are provided.

Since a mixer unit comprises a take-up and a feed spool and further feeding and pick-up means, it will be seen that with an arrangement of the kind shown in Fig. 1 five films are miscible simultaneously. In a disposition of the film spools and the film feeds or paths as here suggested, this number can be enlarged at will merely by enlarging the size of the mounting or bed plate accordingly.

Figure 2:
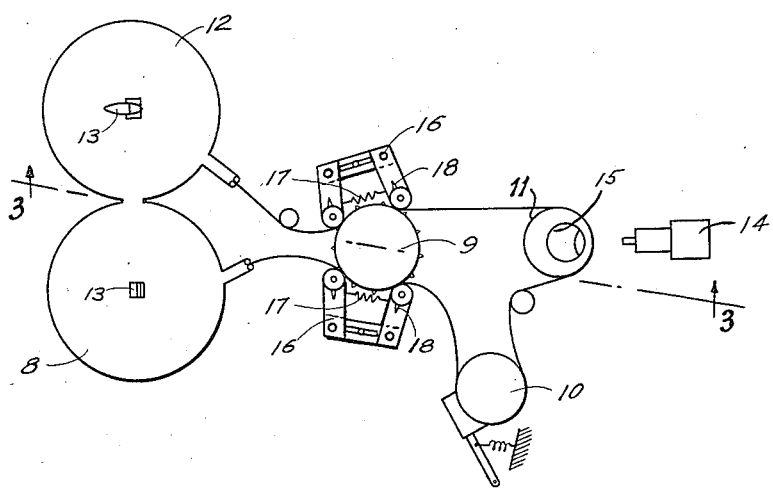
Figure 2 shows the detail of a mixer unit.

In Fig. 2 are depicted the essential components of a mixer unit. The film to be mixed is conveyed from the feeder spool 8 by the feeding roll or sprocket 9 by way of a steadying means 10 to the sound pick-up roll 11 and thence by way of the same conveyor roll or sprocket 9 to the take-up spool 12 the bobbin of which is connected in known manner with the driving mechanism through the intermediary of a friction clutch. The latter is actuated by throwing the levers 13 (Fig. 3), and the position of these levers or handles indicate which spool is coupled with the drive since both spools have one and the same clutch, and since in actual operation one spool must always be disengaged. The scanning or pick-up is insured at 11 by the aid of the light source or lamp and optical means at 14 and photo-cell 15.

In order that the coming and going of the film may be insured in the sprocket wheel 9, presser means are provided at two distinct places as indicated at 16. Each of these consists of two pairs of rollers which are supported in a yoke. The yoke is adapted to be moved away from the conveyor roll and towards the conveyor roll or sprocket. The springs 17 in this connection serve to insure a more delicate adjustment of the pressure of the presser rolls which under the action of these springs are capable of shifting inside slots 18.

There are provided in the assembly arrangement five such units as shown in Fig. 2. The currents coming from the photo-cells are preferably combined for mixing in an input amplifier.

Figure 3:
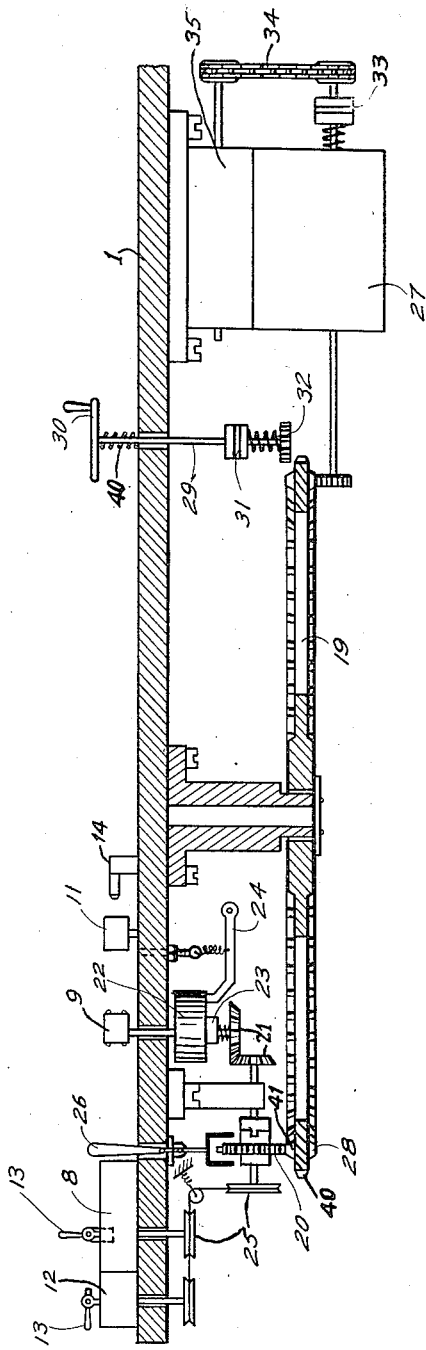
Figure 3 shows the drive mechanism of the apparatus.

Fig. 3 illustrates the driving arrangement of a mixer unit. Upon the bed plate 1 are mounted the feed spool 8 and the take-up spool 12 as well as conveying spool or sprocket 9 which serves to guide the film upon either side of the control or pick-up point 11 comprising the optical means 14. The drive for the sprocket wheel 9 is derived from the tooth-wheel 19, which, according to the invention furnished driving power from different points also for the drive roll of the other units. The drive is insured here by way of a tooth-wheel 20 and the bevel-wheel gearing 21. Upon the shaft of the sprocket wheel 9 is seated a flywheel 22 which is coupled with the shaft of the cone-wheel 21 by way of an elastic clutch or coupler means such as a spring 23. For the purpose of further steadying the operation of the sprocket wheel 9, damping means 24 are provided on the flywheel mass 22, said damping means consist preferably of a felt-lined brake pressed in contact with the flywheel 22, the pressure of said brake being made variable. By the variable damping 24 unsteadiness caused by relaxing of the spring coupling at 23 may be compensated. From the tooth-wheel 20 also the film spools 8 and 12 receive their torque by way of the pulleys 25. The spools may be coupled by way of the throw levers 13 with the drive through a friction clutch of a kind known in the art. By the coupling 26 the tooth-wheel 20 can be caused to become disengaged with the main drive wheel 19 with the result that the entire mixer unit is rendered inoperative.

The actuation of the clutch 26 may be effected in the course of operations so that at will mixer units can be connected and disconnected. The main drive wheel 19 and thus the whole arrangement is driven from the motor 27 by way of the lower gear wheel rim 28. In addition, a manual auxiliary drive 29 is provided whereby on inserting the film the arrangement may be moved without the use of the mechanical drive by motor. This auxiliary drive is normally disengaged by the spring 40 underneath the hand wheel 30. Coupling is effected by depressing the hand wheel 30 with the result that by means of a safety clutch, for instance, a latch coupling 31, the tooth-wheel 32 is caused to mesh with the main drive wheel 19. The said safety coupling device 31 is provided in order that the operator may be protected in a case where he happens to use the manual drive in the course of the operations.

With the main driving motor 27 through a clutch 33 and a chain drive 34 there may be coupled a three-phase motor 35. The latter is employed for the purpose of insuring synchronism in a case where the mixing arrangement itself is to be operated and driven in synchronism with some other outfit such as a picture projector machine.

The main drive wheel 19 has preferably three gear-wheel rims 28, 40 and 41. In the horizontal position as shown, the lower gear-wheel takes care of the torque derived from the source of energy 27, whereas the upper rim furnishes the drive for the different mixing units. In an arrangement as here disclosed, therefore, five driving points are disposed on the top rim, five tooth-wheels 20, for instance. The face or spur tooth wheel of the wheel 19 serves for the manual drive. The wheel itself is preferably journaled in ball bearings, and the bearing means are secured on the bed or mounting plate 1.

The merits residing in the assembly arrangement here disclosed consist (1) in the simplicity and ready operability thereof, and (2) in the fact that each and every unit during actual operation may be connected and disconnected ad lib. On account of the fact that for each unit the drive is derived separately or individually, the advantage of uniformity of distribution of the flywheels required for synchronism is secured.

In each pair of film spools, in addition to the normally provided inlet and outlet holes, there is provided according to the invention in each one an additional opening approximately at the point where the spools contact. In this manner the arrangement is rendered serviceable also for the playing of endless or webs of film by way of the existent conveyor means. A practical requirement may exist for this in a case where a constantly or periodically recurring noise is to emphasize or to be mixed with the acoustic actions to be mixed. However, through the said openings it is also possible to spool a film by way of the sprocket wheel from one bobbin or spool to the other. The re-spooling itself could proceed also during actual operation; in fact, all that is required is that the film spool that is to be re-wound is disengaged with the drive, and that the take-up spool on which the film is to be wound, is coupled with the drive. In other words, the drive need not be altered in this scheme. In the horizontal position of the film spools this advantage is secured in re-spooling that the bobbins of the spools, due to the action of gravity or their own weight, retard or brake the running of the spools to be re-wound so that undue looseness of the film loops is prevented.

The arrangement hereinbefore disclosed may also be used in the vertical position rather than in the horizontal as illustrated.

Having now described my invention, I claim:

A mixing arrangement for sound film apparatus, comprising a plurality of film spools, a plurality of sound reproducers, a plurality of film feed members for feeding film past said reproducers, and a horizontal supporting member, the said film spools and film feed members being mounted with their axes perpendicular to the said supporting member, the said spools and said film feed members being mounted in the same plane whereby the edges of the films travel parallel to said supporting member, and a single large wheel mounted below said bed for driving said film spools and directly driving the said feed members.

FRITZ KLEFFEL.